United States Patent

Bletscher, Jr. et al.

[11] Patent Number: 5,070,495
[45] Date of Patent: Dec. 3, 1991

[54] WRITE CALIBRATION FOR MAGNETOOPTIC DISK RECORDERS

[75] Inventors: Warren L. Bletscher, Jr.; Julian Lewkowicz; Morovat Tayefeh, all of Tucson, Ariz.

[73] Assignee: International Business Machines Corporation, Armonk, N.Y.

[21] Appl. No.: 336,479

[22] Filed: Apr. 12, 1989

[51] Int. Cl.⁵ .................... G11B 7/125; G11B 7/00
[52] U.S. Cl. ..................... 369/116; 369/54; 369/111
[58] Field of Search ............... 369/116, 54, 109, 106, 369/111, 48, 55, 48.28, 44.26, 124; 350/342; 250/205

[56] References Cited

U.S. PATENT DOCUMENTS

| | | | |
|---|---|---|---|
| 3,988,531 | 10/1976 | Laub | 360/36 |
| 4,142,208 | 2/1979 | Oprandi et al. | 358/127 |
| 4,426,693 | 1/1984 | Satoh et al. | 369/116 |
| 4,488,277 | 12/1984 | McFarlane et al. | 369/116 |
| 4,549,288 | 10/1985 | Chan | 369/48 |
| 4,562,567 | 12/1985 | Frankfort et al. | 369/106 |
| 4,631,713 | 12/1986 | Romeas et al. | 369/111 |
| 4,697,258 | 9/1987 | Overath et al. | 369/54 |
| 4,731,773 | 3/1988 | Lewkowicz | 369/59 |
| 4,788,674 | 11/1988 | Maeda et al. | 369/116 |
| 4,813,034 | 3/1989 | Mashino | 369/106 |
| 4,853,915 | 8/1989 | Takasago et al. | 369/54 |

FOREIGN PATENT DOCUMENTS 116204 8/1984 European Pat. Off.
45117 8/1985 European Pat. Off.

Primary Examiner—Robert L. Richardson
Assistant Examiner—Thang V. Tran
Attorney, Agent, or Firm—H. F. Somermeyer

[57] ABSTRACT

Recording operations for an optical disk recorder are calibrated by adjusting recording power level (light intensity) such that a permissible crosstalk can be detected in adjacent erased tracks. Following the power level calibration, pulse duration or width is calibrated for a predetermined symmetry of recorded pulses along the calibration track. Various sequences and procedures are described. Calibration occurs at a plurality of radially spaced-apart tracks.

17 Claims, 4 Drawing Sheets

WRITE CALIBRATION FOR MAGNETOOPTIC DISK RECORDERS

FIELD OF THE INVENTION

The present invention relates to optical disk recorders, particularly to those recorders employing magnetooptic medium.

BACKGROUND OF THE INVENTION

Some optical disk recorders employ constant lineal speed control, i.e., as the laser beam scans radially more outward tracks, the rotational speed of the disk is reduced to maintain a constant lineal track scanning speed. Such recorders are often employed for audio and video recording. On the other hand, data recording devices, such as used with computers and the like, employ a constant rotational speed. It is to be appreciated that at a constant rotational speed a signal of a given duration is recorded as a longer mark in a radially-outward track on the disk than when recorded on one of the radially-innermore tracks. In pulse-position-modulation (PPM) recording, the change in recorded mark lengths create different recording tolerances at different radii of the disk. Different recording formats also result in different recording tolerances. Since the scanning time for the different length marks is relatively constant, slight variations in speed and responsiveness of the recording media, particularly magnetooptic media, can be tolerated. However, when an encoding method known as pulse-width modulation (PWM) is employed, then the tolerances required for successful readback of the recorded information are reduced. PWM provides for higher linear recording densities than PPM. In pulse-width modulation the duration of a pulse recorded on a record track is varied for indicating different informational values. For example, a relatively short duration pulse would represent binary zero, a slightly longer pulse represents unity, a yet longer pulse representing two, and so forth. A single recorded pulse can represent a number up to modulo 10 or 16. Pulse-width modulation greatly enhances the data storing capability of a record media. It is to be appreciated that this greater storage capability comes at a severe price in that distinguishing between various pulse lengths is usually a difficult readback operation, particularly for interchangeable media. That is, one recorder may record pulses which tend to be long while another recorder records pulses which tend to be short. Somewhere in between the short and long pulses a region of ambiguity exists wherein the exact informational content of a given pulse may not be reliably and readily determined even by sophisticated and complex readback circuits. Accordingly, it is desired to provide a uniformity in recording for facilitating pulse-width modulation of information-bearing signals onto optical media such that not only is signal readback facilitated, but that interchange of media among a plurality of recorders is made more reliable.

Optical recording has used constant intensity laser beams for creating recorded pulses on optical media. It is also well known that pulsed or "serrated" writing signals can also be applied. That is, a series of short duration pulses effectively record a single long pulse on the record medium. Thermal diffusion of the heat induced into the recording layer by the recording laser beam also causes distortion of the recorded pulse in optical recording. It is desired to minimize the negative effects of such thermal diffusions by carefully calibrating the laser write pulses to provide a uniformity of recording among a plurality of optical disk recorders.

DISCUSSION OF PRIOR ART

Frankfort et al. in U.S. Pat. No. 4,562,567 disclose an ablative optical recording in which information is recorded in the form of optically-detectable, ablative changes in the optical medium in the form of pits. As soon as a pit is initiated by ablation, the intensity of the laser beam is reduced for forming more accurate pits. A change in the reflectivity of the optical media indicates the onset of pit formation. Such a luxury is not found in magnetooptic recording. Even with this type of control, there is no assurance that the accuracy of the pits is maintained from various optical media to other optical media. Therefore, it is still desired to provide for a calibration which ensures consistency among a plurality of optical recording media.

Romeas et al. in U.S. Pat. No. 4,631,713 shows recording a binary test word on an optical disk comprising a monotonous series of one and zero logic bits of equal duration. Then reading those recorded words and measuring the duration in the bits in the one and the zero state enables calibrating the recording laser to obtain ones and zero recordings of equal duration (pulse-width). The calibration is setting the optical power of the laser to create one and zero recording of equal duration. It is known that alternate ones and zeros are the highest recording frequency resulting in the shortest duration or spacing between successive transitions (this is true for NRZ or NRZI formats). Recording at the maximal frequency of a recorder results in symbol interference which can produce unexpected results in the calibration techniques.

According to this patent, test tracks are provided at the beginning and end of the disk (innermost- and outermost-radial tracks) for producing a correction factor for engraving (recording) power as a function of radius, i.e., the change in engraving power apparently is linear with radius. Once the correct optical power value is determined, then that power is used to carry out all the recordings that follow until it is judged useful to actuate a new test. The periodicity of such tests were determined by the operator or automatically according to a computer program (not disclosed). For example, at the loading of a new disk in the engraving reading apparatus or at regular time intervals such as 48 hours. It appears that this patent does not address all of the variables necessary for providing a extremely precise recording of optical media, i.e., only power value is changed.

The Lewkowicz U.S. Pat. No. 4,731,773, shows a magnetooptic recorder having a write control which tends to reduce unwanted radial enlargement of a recorded mark on a disk. The shape of the heat inducing pulse is altered from an initial high recording initiating value to a recording sustaining value such that the resulted recording in the track is substantially uniform width along the length of the track being scanned. This patent teaches that the control reduces synchronous noise, i.e., second harmonic noise; yet greater correction and control of the writing process is required for successful high lineal density pulse-width-modulation recording.

The European Patent Office patent 45,117, by Discovision Associates, shows an optical recorder which adjusts the laser power for minimizing second harmonic (synchronous noise) distortion in optical recording. While the reduction of synchronous noise is certainly important, the reduction of synchronous noise does not indicate any control of pulse duration necessary for effecting reliable pulse-width modulation; for example, for high-density, pulse-position modulation recording schemes.

European Patent Application 116,204 teaches that a real-time feedback system adjusts the output power of the write laser or similar source for adjusting the modulation timing of a write beam. This adjustment nulls out any unwanted DC component that is exhibited by the recorded data. The feedback is achieved by a read-after-write operation. The patent application teaches that this feedback stabilizes the timing of the transitions in the recorded area. The unwanted DC component is an example of asymmetry occurring in recorded pulses. While this invention provides for accurate recording, it does require read-after-write capabilities, i.e., a multiple-beam head. Such a multiple-beam head adds to the cost of the recorder apparatus. It is desired to provide for precise recording with either a single-beam system or with a recorder such as that described in the European Patent Application which is initially set by a precise calibration technique.

Laub, in U.S. Pat No. 3,988,531, shows a system for compensating for pulse-length variations during readback. Such unintended length variations give rise to duty factor errors. According to Laub, the compensating changes are made to the duty factor of the signal developed while reading the disk. These changes obviate spurious components attributable to duty factor error in image reproduction. Laub describes an ablative system which employs ablated pits for indicating information with unablated areas constituting a spatial representation of a carrier signal frequency modulated by a band of video components. In the presence of duty factor error, the modulating component produces spurious counterparts in the baseband. In read-after-write, a photoreceptor responds to the reading of the record track with a beam of energy to derive an output signal representative of the frequency modulated carrier. In the presence of duty factor error, the output signals are further representative of the spurious component and has a phase and intensity indicative of the sense and extent of the duty factor error. The frequency selector derives the spurious component from the output of the photoreceptor. A compensator having means responsive to the derived output signal develops a first set of timing signals. Then means responsive to the drives spurious component is included for selectively delaying alternate transitional portions of the drive output signal by an amount related to the amplitude of the spurious component for developing a series of adjusted width pulses. The means responds to the adjusted width pulses served to develop a second set of timing pulses. Finally, means are responsive to the first and second set of timing signals to provide for generating a signal having a duty factor corresponding to a desired duty factor. While a carrier signal is used in video recording, audio and data recording are always baseband recording without a carrier. Therefore, this solution to a change in duty factor is not useable in a data baseband recording environment, nor does it appear to provide a complete control of recorded pulses so as to enable high density PWM.

Another duty factor correction system is shown by Oprandi et al., in U.S. Pat No. 4,142,208. A feedback loop is provided for correcting the duty factor of a restored rectangular waveform when its value deviates from the value 0.5.

Chan, in U.S. Pat. No. 4,549,288, shows optical data recording apparatus which enhances a playback signal by comparing the lengths of the lands on a recording medium with the lengths of the pits. The playback signal is then changed to represent equality between such lengths. It is preferred to effect correction at the recording portion rather than relying on readback signal compensation techniques.

SUMMARY OF THE INVENTION

In a first aspect of the invention, the recording power of the laser recording system is calibrated at a radially innermost one of the tracks to produce a minimal noise level upon readback. After adjusting the laser recording power, the recording pulse duration is calibrated for minimal noise in the same track and in a second one of the tracks.

In a further aspect of the invention, the laser recording pulse duration is calibrated for minimal noise in a radially outermore one of the tracks. In a still further aspect of the invention, the laser pulse recording duration is adjusted for minimal noise at a plurality of radially displaced tracks.

It is preferred that the calibration for minimal noise in both the power and duration calibrating steps identified for multiple reading of each recorded test pattern for minimizing spurious effects on the calibrated values. It is preferred that the calibration occur each time a recorder is powered up. The invention is particularly useful with a magnetooptic recorder.

The foregoing and other objects, features and advantages of the invention will be apparent from the following more particular description of a preferred embodiment of the invention, as illustrated in the accompanying drawings.

DETAILED DESCRIPTION OF A PREFERRED EMBODIMENT

Figure 1:
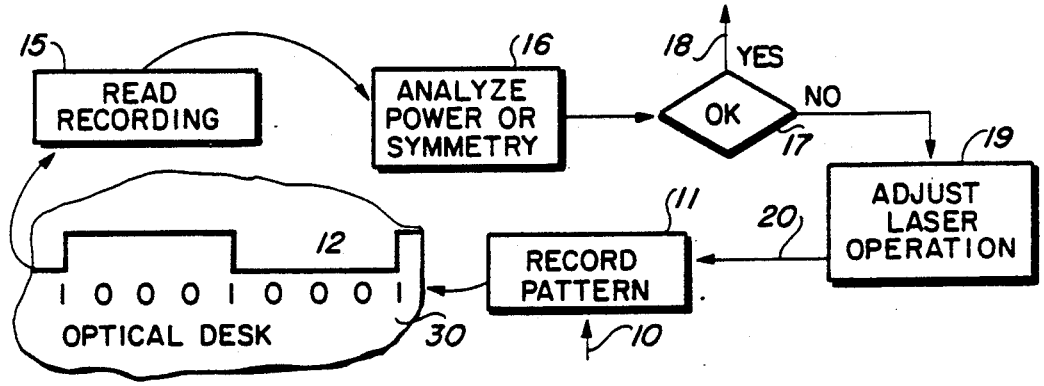
FIG. 1 is a simplified flowchart showing the broad operation of the present invention.

Referring next to the drawings, like numerals indicate like parts and structural features in the various figures. FIG. 1 broadly illustrates the sequence of operations used in practicing the present invention. Arrow 10 indicates that a calibration process is to begin. The first step 11 repeatedly records a pulse pattern 12 on optical disk 30 along an entire length of a magnetooptic track. Pattern 12 is selected to be relatively low frequency (long half-wavelengths), such as using a binary data pattern 100010001, for eliminating inner-symbol interference. In the binary data pattern 100010001, each digit represents a potential transition position. As will become apparent, the test pattern is used for independently and sequentially adjusting power level of a laser and the pulse duration of the pulses for enabling symmetry in the recorded signal pattern 12 on the optical disk. After pattern 12 is successfully recorded along a single track to be used for a calibration, the recorded pattern is read at step 15. The reading preferably includes a repeated readback in each calibration track, such as ten scans of each calibration track. The repeated readings in each calibration step tend to average out spurious components in the readback signal, such as may be caused by runout, servo drift and other parameters known in the optical recording art. The readback signals are analyzed either for symmetry or maximum power without undue intertrack interference at step 16. It is preferred that maximum power be first determined and then symmetry of the pulses along the track be established. The power or symmetry indicating signals, later described, are averaged (integrated) over the reading period. Upon completion of the repeated readback, the resultant asymmetry indicating signal is compared with a symmetry threshold. If the measured intertrack interference or asymmetry is within predetermined tolerances at OK step 17, then the calibration is complete as indicated by arrow 18. The pulse amplitude and pulse duration for achieving a desired recorded pattern occurring at step 17 are used for subsequent recording of data signals. In the event that the analyzed asymmetry or intertrack interference is beyond the desired tolerance limits, then at step 19 the laser operation is adjusted either for intensity variation (power adjustment) or for duration adjustment (pulse-width adjustment). Then as indicated by arrow 20, the pattern is again recorded at step 11. With each new adjusted laser operation, calibration is recursive until a satisfactory recording is obtained.

Figure 2:
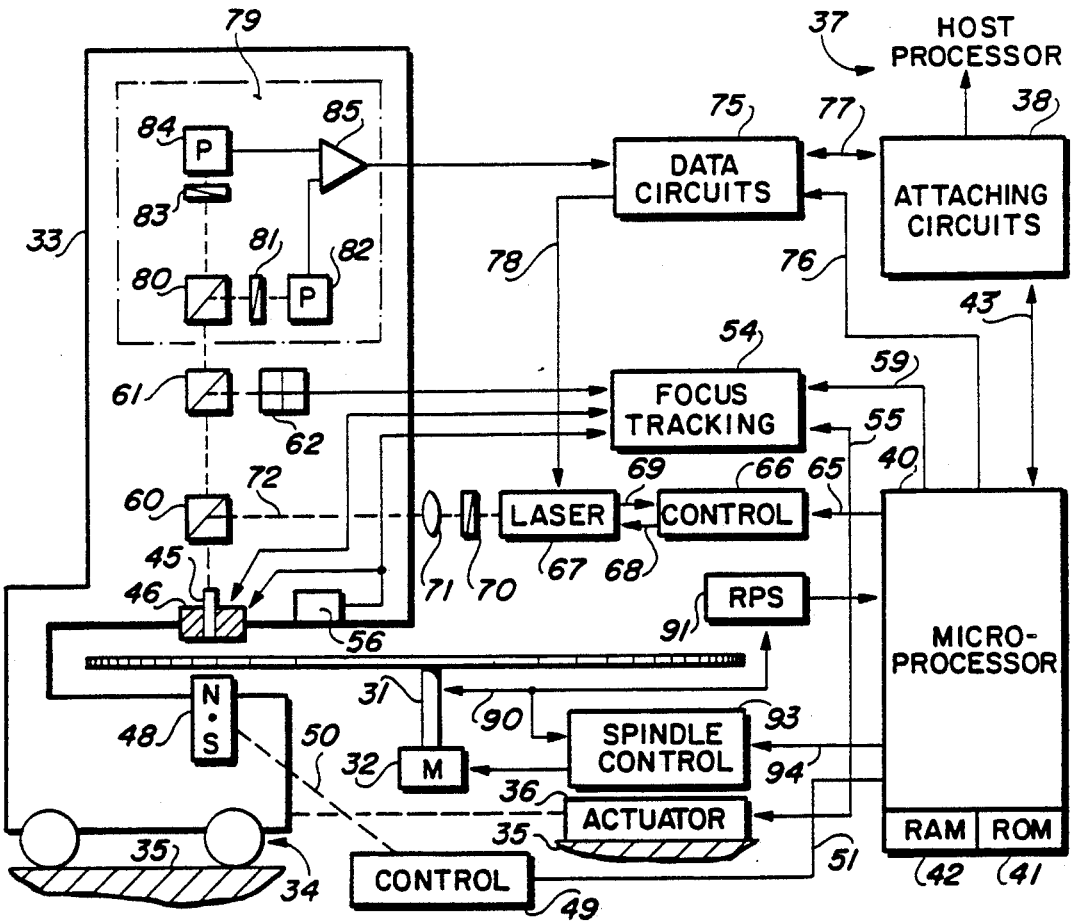
FIG. 2 is a block diagram illustrating a magnetooptic recorder with which the present invention may be advantageously employed.

An optical recorder with which the present invention may be advantageously employed is shown in FIG. 2. A magnetooptic record disk 30 is mounted for rotation on spindle 31 by motor 32. Optical head-carrying arm 33 on head-arm carriage generally denoted by numeral 34 moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak magnetic steering field for directing the remnant magnetization direction of a small spot on disk 30 illuminated by laser light from lens 46. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 rotates so the south pole is adjacent disk 30. Magnet 48 control 49 which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 36. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and switching actions of fine actuator 46. Sensor 56 senses the relative position of fine actuator 46 to head arm carriage 33. Each of the lines 57, 58 consists of two signal conductors, one conductor for carrying a position error signal to circuits 54 and a second conductor for carrying a position control signal from circuits 54 to the respect focus and tracking mechanisms in actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted modulation. In this regard, data circuits 75 (later described) supply data-indicating signals over line 78 to laser 67 for effecting such modulation. This modulated light beam passes through polarizer 70 (linearly polarizing the beam), thence through collimating lens 70 toward half mirror 60 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75 also ancillary circuits (not shown) relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photo cell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40 Microprocessor 40 employs such rotational signals for controlling access to data storing segments on disk 30 as is widely practiced in the magnetic data storing disks Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 3:
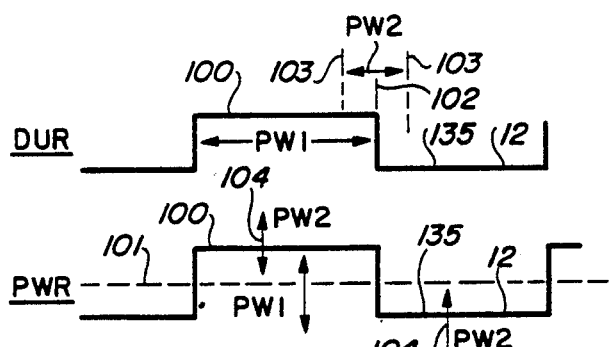
FIG. 3 is a set of two idealized waveforms for illustrating two calibration steps useable in the present invention.

Referring next to FIG. 3, adjusting the controlled variables of the signal pattern 12 is explained. Two variables are provided The first variable PW1 is the parameter of the first half cycle 100 of signal pattern 12. For measuring duration (DUR), DW1 is the duration of the first one-half cycle 100, while for calibrating to power (PWR), PW1 represents the amplitude of the signal pattern 12 about a zero reference axis 101. The second variable PW2 is the independent variable and indicates the permitted adjustment range of duration and power. For duration, PW2 causes the laser control 66 to adjust pulse duration about a nominal pulse duration value 102 to outer limits 103, which can provide for a maximal symmetry corresponding to a minimal noise situation. In the power adjustment, PW2 is a permitted adjustment range of the nominal amplitude of the positive and negative portions of signal pattern 12, as indicated by the two double-headed arrows 104.

Figure 4:
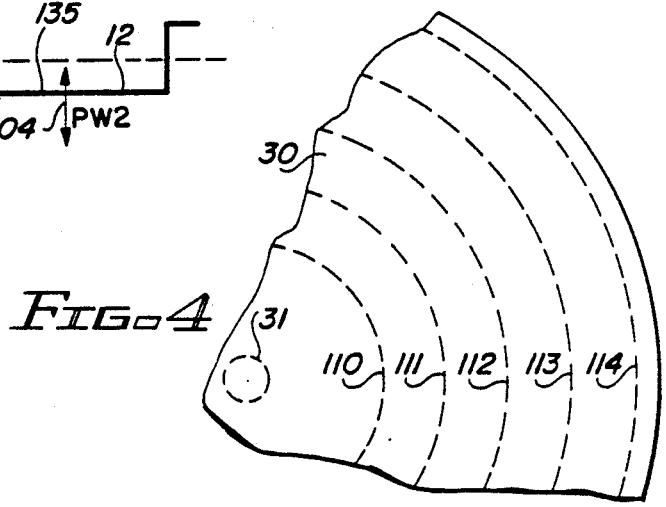
FIG. 4 is a partial plan diagrammatic view of a magnetooptic disk showing the radial relationship of various calibration tracks.

Referring next to FIG. 4, a portion of magnetooptic disk 30 is shown in diagrammatic form. At a radially-inwardmost track 110 of the large number of concentric tracks, the laser 67 power is adjusted for minimal asymmetry in a readback signal using test pattern 12. Following this adjustment, a plurality of duration adjustments are made at the radially displaced tracks 110, 111, 112, 113 and 114. It has been found that the duration variation of the recorded signal pattern 12 is nonlinear across the recording band of optical disk 30. If a more linear variation occurs, fewer calibration tracks 110 to 114 may be used; if a greater nonlinearity is found, then a larger number of calibration tracks should be used. It is to be appreciated that between the calibration tracks 110-114 there occur a large number of data storing tracks.

Figure 5:
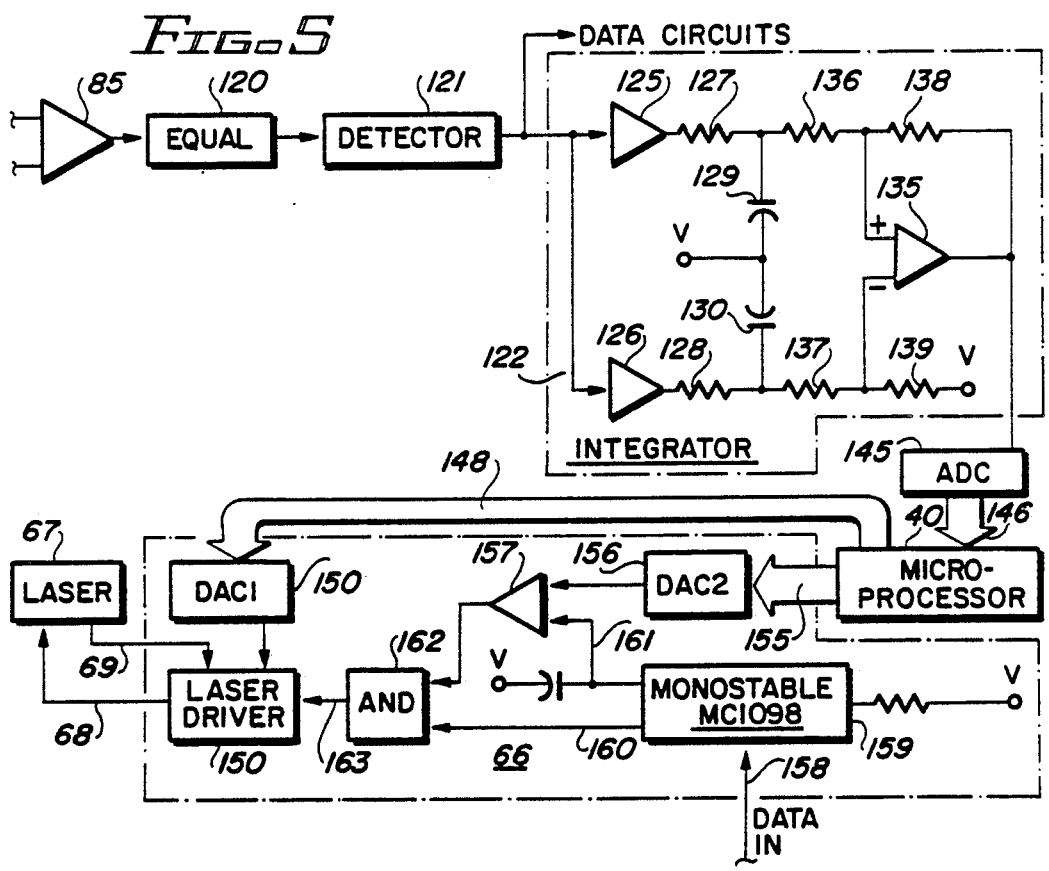
FIG. 5 is a simplified showing of an asymmetry detector used in practicing the present invention in the FIG. 2 illustrated recorder.

FIG. 5 illustrates a symmetry detector and feedback control used during the calibration process. The readback data signal amplifier 85 (also see FIG. 2) supplies the readback signal through an equalizer circuit 120 to data detector 121. Both circuits 120 and 121 are a portion of data circuits 75. In accordance with the invention, an asymmetry detector 122 receives the output signal from data detector 121 for analyzing and integrating the signal pattern 12 readback signal. It is to be appreciated that circuit 122 is operatively connected to detector 121 for receiving the signals only during the calibration process. Suitable switching circuits (not shown) are provided for directing the output of detector 121 to data processing circuits during data readback. Circuit 122 includes electronic gates 125 and 126. The two gates supply the respective output signals through resistors 127 and 128 to storage capacitors 129 and 130. The capacitors 129 and 130 are commonly connected to a reference voltage source V. When the readback signal of pattern 12 is symmetrical, then the voltages integrated by capacitors 129 and 130 are equal. When there is asymmetry, then the values stored in the capacitors 129 and 130 are unequal in accordance with the average of the asymmetry during a plurality of reads of the recorded test signal pattern 12. Amplifiers 125 and 126 are arranged such that amplifier 125 only responds to the positive going portion 100 of the readback signal while amplifier 126 responds only to the negative half 135 of signal pattern 12.

Differential amplifier 135 differentially receives the integrated values of voltage in capacitors 129 and 130 through resistors 136 and 137, respectively. Feedback resistor 138 stabilizes operation of the differential amplifier 135. Resistor 139 provides a bias voltage. Differential amplifier 135 supplies its output signal, which is indication of asymmetry of the currently recorded and readback signal pattern 12 to analog to digital convertor ADC 145. The converted digital value is supplied over bus 146 to microprocessor 40. The digital value transmitted over cable 146 indicates the asymmetry of the currently recorded signal pattern 12. Microprocessor 40, as explained later with respect to FIG. 8, supplies varying control signals to adjust the power or pulse duration of laser 67 via laser control 66. For adjusting laser beam intensity (adjust laser power), microprocessor 40 supplies a digital value over bus 148 to digital-to-analog convertor DAC1 149. DAC1 149 supplies a control signal to laser driver 66 for adjusting the laser 67 output light intensity. Once the power calibration phase is complete, the value output by DAC1 149 remains constant throughout the rest of the calibration process.

For adjusting pulse duration of the laser pulse from laser 67, microprocessor 40 supplies an adjusted digital value over bus 155 to DAC2 156. DAC2 supplies its pulse duration indicating signal to comparator 157 for adjusting the duration of the laser output light pulses, as will become apparent.

In pulse-width modulation, a data input on line 158 (corresponds to line 78 in FIG. 2) varies the data to be recorded from data circuit 75, i.e., supplies test signal pattern 12. Monostable multivibrator 159 (an integrated chip identified as MC1098, available from Motorola Semiconductor, Inc.) supplies data modulated signals over line 160 to AND circuit 162 and comparator 157. Differential comparator 157 supplies its output signal to AND circuit 162. With value of DAC2 signal combined with the data signal, the data signal in effect modulates the standard width produced by microprocessor 40 indications over bus 155. Therefore, the signals on bus 155 indicate a nominal adjusted pulse duration to be used during recording on the instant media. AND circuit 162 supplies its output pulse over line 163 to laser driver 150.

Figure 6:
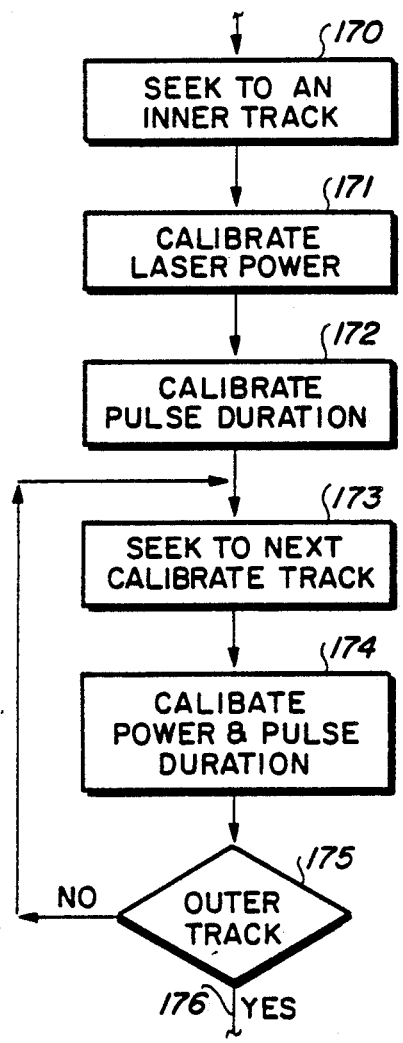
FIG. 6 is a flow diagram illustrating the calibration steps used in calibrating one surface of a magnetooptic record medium.

FIG. 6 is a simplified calibration flow diagram showing the sequence of operations for a write calibration using the present invention. The reason for performing the calibration is not important to its understanding of the calibration process, per se; it being understood that calibration will occur at least when the recorder is powered up and maybe repeated at predetermined elapsed times thereafter. In any event, the first machine operation at step 170 to be performed causes the carriage 33 to move to the radially-inwardmost track 110. Within the scope of the present invention, it is a notion to seek one of the innermore radial tracks, such as either track 110 or 111, for performing an initial laser beam intensity adjustment; it is preferred that the radially inwardmost track 110 be used. Once the desired track is reached, then at step 171 the laser power is calibrated.

While power calibration can be limited to a single radially-innermore ones of the tracks, power calibration can be performed at a plurality of radially spaced-apart tracks, such as at each track where any calibration occurs. Recording power level is preferably calibrated to a maximum level whereat intertrack interference is not undue. That is, some intertrack crosstalk or interference is permissible; the level of such permitted crosstalk is empirically determined. At each power calibration track, the track is initially recorded at a nominal power level using a test pattern that preferably exhibits no intersymbol interference along the track length, therefore, is preferably recorded at a pulse repetitive frequency less than the maximum pulse repetitive frequency for the recorder. The calibration is iterative; each successive iteration being conducted at increasing recording power (light intensity) levels until a threshold crosstalk level is reached at either one (preferably a radially-outward adjacent track is used for sensing crosstalk) of the immediately-radially adjacent tracks. In each iteration, after the power calibration track is first recorded, then in a second step, the transducer is moved to scan the immediately-radially adjacent track(s) (either one or both of the radially adjacent tracks may be scanned for crosstalk measurements) which are always erased for detecting crosstalk signals derived from the recorded power calibration track. The transducer scans the erased tracks a plurality of disk rotations, such as ten rotations, sensing for signals derived from (crosstalk) the power calibration track. Such sensed signals are integrated for averaging the signal value. Whenever the integrated or averaged crosstalk signals are below the empirically-determined threshold, additional iterations are conducted at increasing recording power levels until a recording power level causing crosstalk at the threshold level is reached. This recording level becomes the power level to be used for subsequent signal recording in the current power calibration track and radially-outwardly adjacent tracks up to the next radially-outward power calibration track, if any.

Following the power level calibration, pulse duration or width is calibrated. Two different processes may be employed. In a first process, power calibration occurs at one of the tracks. In that event, the pulse duration is calibrated at such power calibration track, then the transducer is moved to radially-outward ones of the tracks to be used for pulse-duration calibration at the power level calibrated at the radially-innermore one of the tracks. It should be appreciated that the calibrated power level may be linearly increased with increasing radius, as is known, and the power level employed at the pulse-duration calibration tracks is calibrated power level increased to compensate for a greater radius. In a second process, each power calibration track is also a pulse-duration calibration track. In this process, the pulse-duration calibration proceeds at such power calibration tracks. Other processes may be envisioned for combining the power and pulse-duration calibrations. The first step 173 ensures the transducer is scanning the proper track; a seek may or may not be required. Once at the desired calibration track, the pulse duration may be calibrated at step 174 as above stated. Then at step 175, whether or not the outermost track 114 has been used for calibrating pulse duration is tested. If not, steps 173 and 174 are repeated; otherwise, the calibration is completed as indicated at line 176. At step 174, both power level and pulse duration may be calibrated; alternately, only pulse duration may be calibrated.

Figure 7:
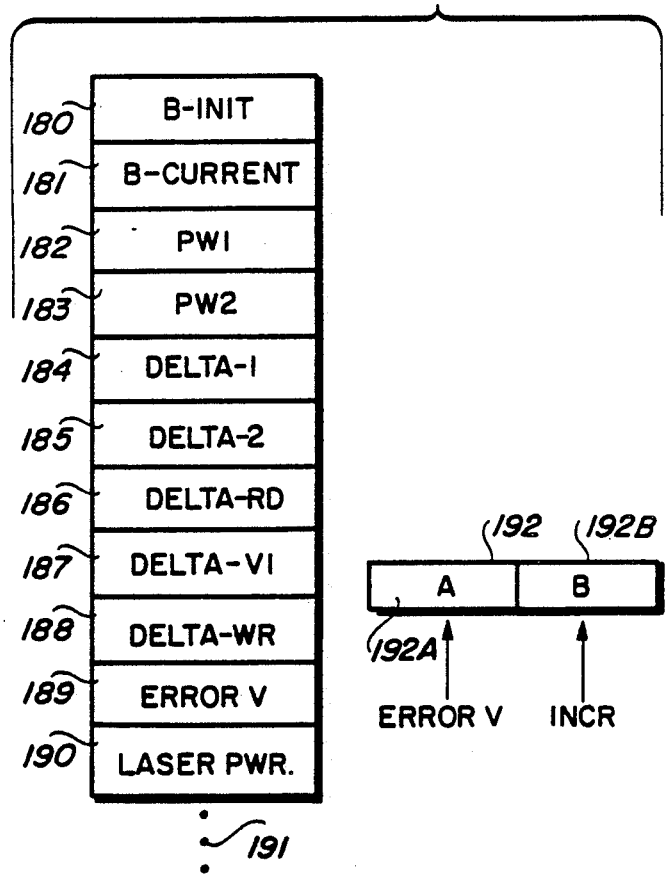
FIG. 7 is a simplified showing of some data structures used in connection with the programmed control of the calibration process.

FIG. 7 illustrates, in simplified form, the storage portion of microprocessor 40 and 42 which stores the various parameters used in the calibration. A value "B" is an increment used for changing the parameter PW2, whether it be for power or duration adjustment. B has an initial value as indicated in register 180. The current value of B is indicated in register 181. The parameters PW1 and PW2 reside in registers 182 and 183, respectively. The various set of increments or deltas are stored, respectively, in registers 184 through 188, inclusive. The meaning of the delta parameters will become apparent. The ERRORV value resides in register 189 and represents the current measured asymmetry of the readback signal resulting from sensing signal pattern 12. The current laser power is stored in register 190. Of course, other controls are used by microprocessor 40 in controlling the FIG. 2-illustrated recorder as indicated by ellipsis 191. A hardware register 192 of microprocessor 40 stores ERRORV and the variable B during computations. Portion 192A stores ERRORV while portion 192B stores the variable B. The variable B is increment intermediate successive reads during the calibration occurring in a given calibration track. ERRORV is loaded from ADC 145 into register portion 192A upon the completion of each repeated readback for the respective adjusted controls of PW2.

Figure 8:
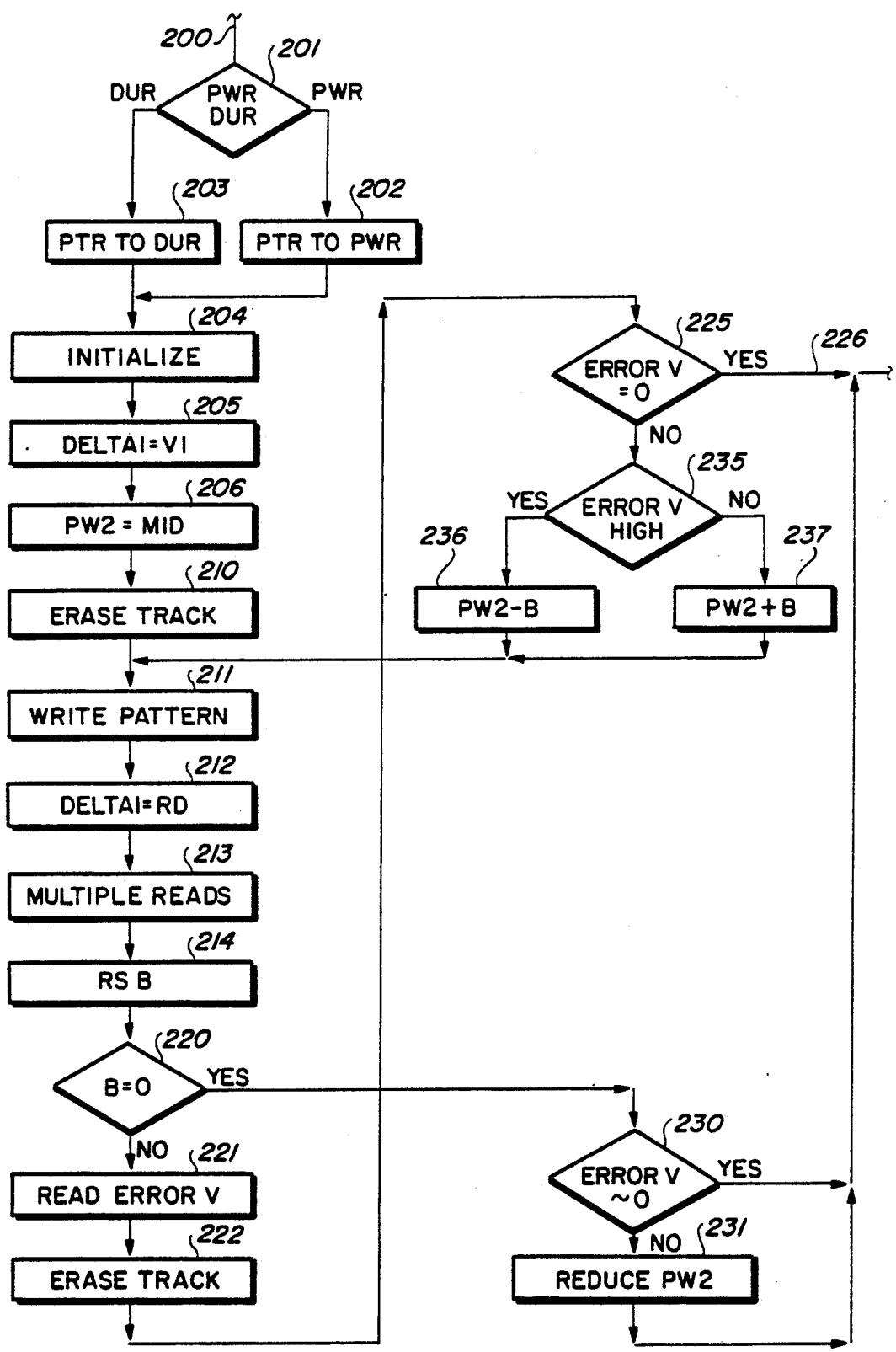
FIG. 8 is a simplified flowchart of machine functional steps performed under microprocessor control for implementing the calibration in the FIG. 2-illustrated recorder.

Referring next to FIG. 8, the machine operation steps effected through microprocessor programmed control are described. Invocation of the illustrated machine operations by normal and known programming techniques is represented by numeral 200. At step 201, microprocessor 40 determines which step 171 or 174 is to be performed. Step 201 exit PWR indicates step 171 is to be performed while exit DUR indicates step 174 is to be performed. For power calibration, microprocessor 40 at step 202 establishes a pointer (PTR) pointing to the previously stored laser power parameters (PWR). Similarly, for the duration calibration step 174, microprocessor 40 at step 203 establishes a pointer to the previously stored pulse duration parameters. These parameters include B, B INT, PW2, DELTA1, PATTERN 12, DELTA-RD, etc. (see FIG. 7). At step 204, microprocessor 40 initializes the working registers 180–190 by transferring the pointed-to parameters to the working registers. Register 192 is erased. Such initialization includes loading the two B registers 180 and 181 including making the value stored in register 181 equal to the value stored in register 180; establishing PW1 and PW2 in registers 182 and 183, as diagrammatically represented in FIG. 3; and establishing delta values in registers 184 to 188. Laser power register 190 is also initialized to a mid-value for power calibration, but to the previously adjusted power level for duration calibrations. ERRORV register 189 is nulled. At step 205,
DELTA1 becomes equal to V1, i.e., the value of register 187 is transferred to register 184. At step 206, PW2 is equal to the mid-range value. Steps 205 and 206 illustrate a portion of the initialize step 204.

The following description relates to the actual calibration process, whether it be for power or duration calibration. The calibration track currently being accessed is erased at step 210. At step 211, microprocessor 40 records test signal pattern 12 repeatedly throughout the entire extent of the erased calibration track. At step 212, DELTA1 is made equal to the read value, removing the erasure value DELTAV1 from register 184 (as inserted at step 205). These DELTA values indicate the current relative intensity of the laser light beam control as provided by microprocessor 40 over bus 148 to laser driver 150 via DAC1 149. Multiple readback operations of the just-recorded test patterns occur at step 213. During these multiple reads, symmetry detector 122 is operatively connected to detector 121 for measuring the asymmetry of the recorded test signal pattern 12, as explained with respect to FIG. 5. Upon completion of the multiple reads, at step 214, the value of B stored in register 181 is reduced. That is, the initial value of B is large. After the first calibration, the value of B is reduced. With the reduction being one-half of the previous value for each iteration of the calibration, until a small value is reached, whereupon B is made equal to zero. At step 220, the current value of B is calculated in 214 it is determined. If the value is not zero, then symmetry has not been reached. Accordingly, the current value of ERRORV is sensed by microprocessor 40 by sensing the signals on bus 146 at step 221. The sensed value is then stored in register 189. Then at step 222, microprocessor 40 transfers the value V1 from register 187 as DELTA1 to register 184. This erasure value goes over bus 148 for adjusting the laser driver 150 control for erasing the track. Track erasure occurs at step 223, which prepares the system for writing the pattern by repeating step 211 or erases the calibration tracks at the completion of the calibration preparatory for data recording.

While the track erasure is occurring at step 223, microprocessor 40 prepares for writing the pattern 211. At step 225, the value of ERRORV stored in register 189 is compared to zero. If ERRORV is zero, then microprocessor 40 causes the system to exit the calibration routine at line 226. Such exit also disconnects circuit 122 from detector 121 such that detector 121 can be used for reading back data recorded in tracks on disk 30. On the other hand, when ERRORV is nonzero at step 225, another calibration step is required It may be that the value of B (the increment) is zero at step 220. In this instance, the calibration may not have completely made the recording of test signal pattern 12 symmetrical. Even at that, the best calibration possible has been achieved. Accordingly, from step 220, microprocessor 40 directs the machine operations to step 230 for comparing the value of ERRORV in register 189 with zero. If the value is in fact zero, then exit at 226 is taken. Otherwise, microprocessor 40 causes step 231 to be executed for reducing the value of PW2 stored in register 183 by a predetermined amount and then exits the set of machine operations.

The increment B is adjusted between each successive recursion of the calibration process. Microprocessor 40, when leaving machine operations step 225, examines the value of ERRORV of register 189 at step 235 to determine whether or not it has increased over the previous value. That is, the value stored in register 192A is compared with the contents of register 189. The ERRORV is higher than the value PW2 stored in register 183, it is decremented at step 36 by the value of B in register 192B, which is the same value as in register 181. On the other hand, if the error voltage has decreased, then the increment B is added to PW2 at step 237 and used for writing pattern 211 by insertion into register 192B.

While the invention has been particularly shown and described with reference to a preferred embodiment thereof, it will be understood by those skilled in the art that various changes in form and details may be made therein without departing from the spirit and scope of the invention.

What is claimed is:

1. In a machine-effected method of operating an optical disk player having an optical disk with a plurality of concentric tracks each of said tracks for serially storing data signals, radially-innermost and radially-outermost ones of the tracks, a laser system for impinging a light beam on the tracks for recording and reading data signals on and from any of said tracks, the laser system having laser operational parameters with adjustable values, one parameter being laser operation power level and a second parameter being duration of emitted light pulses;

including the machine-executed steps of:

moving the light beam to one of the radially-innermost tracks;

at said radially-innermost track, calibrating the laser operation power level for recording data signals on said radially innermost one of the tracks such that readback of recorded signals on said radially-innermost one of said tracks exhibits a minimal synchronous noise level;

moving the light beam to a radially-innermost track;

calibrating the laser operation power level for recording data signals on said radially-innermost one of the tracks and adjusting the laser operation parameters until the readback of recorded signals on said radially-innermost one of said tracks exhibits a minimal synchronous noise level, making the parameter values used to obtain said minimal synchronous noise readback calibrated laser operation parameters; and adjusting the laser operation power level for recording on tracks other than said radially-innermost and radially-outermost ones of the tracks by linearly interpolating or extrapolating the power levels based upon the radial position of such tracks relative to said radially-innermost and radially-outermost ones of the tracks and said calibrated power levels of said laser at said radially-innermost and radially-outermost ones of said tracks.

2. In the machine-effected method set forth in claim 1, further including the machine-executed steps of:

adjusting the laser operation power level for recording data signals on spaced-apart middle ones of said tracks which are disposed on the optical disk intermediate said radially-innermost and radially-outermost tracks such that the readback of recorded signals on said radially spaced-apart middle ones of said tracks exhibit a minimal synchronous noise level, said spaced-apart middle ones of said tracks being radially spaced from any other of the spaced-apart middle ones of said tracks by at least one tracks; and in said adjusting step, independently linearly adjusting the laser power level for recording between said radially-innermost one and between said spaced-apart radially middle one of the tracks and between said radially-outermost one and said radially spaced-apart middle ones of said tracks.

3. In the machine-effected method set forth in claim 2, further including the machine-executed steps of:

selecting a plurality of said radially spaced-apart middle ones of said tracks such that an equal number of tracks are disposed between said spaced-apart middle ones of the tracks;

calibrating by adjusting said laser operation power level at all of said plurality of middle ones of said tracks to generate a readback signal having a minimal synchronous noise level; and independently linearly adjusting said laser power of operation at each track between radially adjacent ones of the space-apart middle ones tracks whereat the laser operation power level was calibrated.

4. In a machine-effected method of operating an optical disk recorder having an adjustable laser means and an optical disk with a multiplicity of radially-spaced apart concentric tracks for recording signals therein, said laser means having multiple-adjustable operation parameters for changing power level and output pulse duration of the laser beam, recording means for pulse-width modulating the laser operation for recording data-bearing signals in the tracks as a series of pulse-width modulated recorded pulses;

including the machine-executed steps of:

at a predetermined plurality of first ones of said tracks which first ones of said tracks are radially-spaced apart by a predetermined number of intervening tracks in accordance with a predetermined radial-spacing pattern, calibrating said laser operation by adjusting one of said parameters, respectively, at each of said first ones of said tracks for recording a predetermined test pattern on said first ones of said tracks, then reading the recorded test pattern to create a readback signal and measuring a synchronous noise level of the readback signal; repeating said adjusting, recording and reading steps until said synchronous noise level has reached a minimal value;

storing values of the adjusted laser means parameters used for recording the signals in the respective ones of the first ones of the tracks as calibrated parameter values; and recording data signals on any of the intervening tracks and adjusting said one parameter of the laser means by interpolating the stored calibrated parameters values between the calibrated parameter values derived respectively from radially adjacent ones of the first ones of said tracks, said interpolation being linearly proportional to the relative radial position of each said intervening track with respect to the two radially closest ones of the first ones of said tracks to said each intervening track.

5. In the machine-effected method set forth in claim 4, further including the machine-executed steps of:

selecting said one of said parameters as a first one of said parameters for a given one of said first ones of said tracks and calibrating the laser means at said given one of said first ones of said tracks by adjusting said first one parameter and calibrating said laser means by adjusting a second one other than said first one of said parameters for all of said first ones of said tracks other than said given one of said first ones of said tracks.

6. In the machine-effected method set forth in claim 4, further including the machine-executed steps of:
selecting said one of said parameters for use in all of said first ones of said tracks.

7. In the machine-effected method set forth in claim 4, further including the machine-executed steps of:
selecting a magnetooptic disk as the optical disk.

8. In the machine-effected method set forth in claim 7, further including the machine-executed steps of:
selecting a signal pattern to record on said first ones of said tracks for said calibration which exhibits insubstantial intersymbol interference.

9. In the machine-effected method set forth in claim 7, further including the machine-executed steps of:
selecting a symmetrical signal pattern having insubstantial intersymbol interference for recording in said first ones of said tracks for said calibration; and
measuring the symmetry of said readback signal and selecting an adjustment value of said one parameter which results in a minimum asymmetry in said readback signal as an indication of said minimal synchronous noise level.

10. In a machine-effected method of adjusting operation of a laser in an optical information-bearing signal recorder having a record member in optical communication with said laser;
the machine-executed steps of:
setting the operation of the laser to a predetermined operational state of power level and pulse duration;
recording a test pattern for supposedly resulting in a symmetrical readback in a readback signal derived from sensing a test pattern recorded along a track of the record member using the laser while in said predetermined operational state and selecting a symmetrical pattern that exhibits insignificant intersymbol interference when recorded along said track;
reading the recorded test pattern from the track for creating a readback signal and analyzing the readback signal for asymmetry; and
adjusting the laser operation to a second operational state of power level and pulse duration which reduces asymmetry of the readback signal including repeating said setting, recording and reading steps including repeatedly adjusting the laser operational state to further reduce said asymmetry in the readback signal until the asymmetry of the readback signal is reduced to a predetermined tolerance about ideal symmetry, including independently adjusting the pulse duration of a predetermined one portion of the test pattern and adjusting the power level of laser operations.

11. In the machine-effected method set forth in claim 10, further including the machine-executed steps of:
first adjusting the power level of the laser to reduce asymmetry in a first repetition of said setting, recording and reading steps; and
second adjusting the laser pulse duration during repetitions of said setting, recording and reading steps after said first repetition.

12. In apparatus for recording data signals onto an optical disk having a large plurality of concentric record tracks, including, in combination:
laser means for supplying a radiation beam to an optical disk for recording and reading data signals to and from record tracks on the record disk, said laser means being adjustable as to laser operation parameters including power level and output radiation pulse duration;
digital signal storage means;
laser calibration circuits connected to said laser means for calibrating said laser means at each one of a plurality of first ones of said record tracks for recording signals on the respective tracks for enabling readback of the recorded signals for generating a readback signal having a minimum of synchronous noise by adjusting a value of a one of said laser operation parameters at respective ones of said first ones of said tracks and being connected to the digital signal storage means for supplying said adjusted value of the respective one parameter values to said digital signal storage means; and
recording control means connected to said laser means and to said digital signal storage means for adjusting operation of said laser means for recording data signals on any of said record tracks by reading the stored parameter value from the digital signal storage means and adjusting the one parameter of the laser means to the stored value or to linearly interpolate the stored value for tracks intermediate two of said first ones of said tracks.

13. In the apparatus set forth in claim 12, further including, in combination:
parameter selection means in said laser calibration circuits for selecting a first one of said laser operation parameters for calibration of the laser means at a given one of said first ones of said tracks and selecting a second one other than said first one of said laser operation parameters for use at all others of said first ones of said tracks other than said given one of said first ones of said tracks.

14. In the apparatus set forth in claim 12, further including, in combination:
parameter selection means in said laser calibration circuit for selecting a first one of said laser operation parameters for calibration of the laser means at all of said first ones of said tracks.

15. In the apparatus set forth in claim 12, further including, in combination:
said optical disk having a magnetooptic recording layer and said laser means operates to pulse-width record data signals on said magnetooptic recording layer.

16. In the apparatus set forth in claim 15, further including, in combination:
signal generating means in said laser calibration means for supplying a test pattern to be recorded repetitively on all of said first ones of said tracks for use in the calibration and generating a test pattern having insignificant intersymbol interference; and
pulse-width recording means coupled to said signal generating means and to said laser means for receiving said test pattern and recording said test pattern on all of said first ones of said tracks and reading means for reading the recorded test pattern from the respective first ones of said tracks for said calibration.

17. In the apparatus set forth in claim 16, further including, in combination:
symmetry means in said laser calibration means connected to said readback means for measuring the symmetry of the readback signal of said recorded test pattern; and control means in the laser calibration means connected to the symmetry means for actuating the recording means to rerecord the test pattern modified by adjusting a value of a predetermined one of said laser operation parameters until a minimal asymmetry is detected and then actuating the laser calibration means to store the value of the adjusted predetermined one of said laser operation parameters in said digital signal storage means.

* * * * *